United States Patent [19]

Handa

[11] Patent Number: 4,793,675
[45] Date of Patent: Dec. 27, 1988

[54] ELEMENT HAVING LIGHT WAVEGUIDES AND METHOD OF MAKING SAME

[75] Inventor: Yuichi Handa, Tokyo, Japan

[73] Assignee: Canon Kabushiki Kaisha, Tokyo, Japan

[21] Appl. No.: 170,622

[22] Filed: Mar. 18, 1988

Related U.S. Application Data

[63] Continuation of Ser. No. 674,919, Nov. 26, 1984, abandoned.

[30] Foreign Application Priority Data

Dec. 2, 1983 [JP] Japan ............................ 58-226981

[51] Int. Cl.$^4$ .............................................. G02B 6/10
[52] U.S. Cl. ................................ 350/96.13; 350/96.14
[58] Field of Search ........................... 350/96.13, 96.14

[56] References Cited

U.S. PATENT DOCUMENTS 4,369,202  1/1983  Verber ..................................... 427/8
4,418,980  12/1983  Keil et al. ........................... 350/96.14
4,548,464  10/1985  Auracher et al. ................. 350/96.13

OTHER PUBLICATIONS

"LiNbO$_3$ Light Wave Guide Formed by Ion Exchange" Pre-Publication for the 43rd Science Lecture Meeting of the Applied Physics Institute (Tokyo University Production Technology) 28p-A-11 at p. 99.

Primary Examiner—William L. Sikes
Assistant Examiner—Robert E. Wise
Attorney, Agent, or Firm—Fitzpatrick, Cella, Harper & Scinto

[57] ABSTRACT

A method of making and an element having a light waveguide in which the input-output area through which light is input or output is made into a light waveguide of a high threshold value of optical damage formed by outside diffusion of lithium oxide or by ion exchange and the optically functional portion in which the waveguide light is modulated or deflected by extraneous action is made into a light waveguide formed by diffusion of a metal of high light modulation or light deflection efficiency.

12 Claims, 1 Drawing Sheet

ELEMENT HAVING LIGHT WAVEGUIDES AND METHOD OF MAKING SAME

This application is a continuation of application Ser. No. 674,919 filed Nov. 26, 1984, now abandoned.

BACKGROUND OF THE INVENTION

1. Field of the Invention

This invention relates to an element having light or optical waveguides and a method of making the same.

2. Description of the Prior Art

Studies for applying a thin film type optical element, i.e., an optical element using a light waveguide, to a light deflector, a light modulator, a spectrum analyzer, a correlater, an optical switch or the like have heretofore been carried out actively. In such an element having a light waveguide, the refractive index of the light waveguide is varied (by an extraneous action) such as the acousto-optic (AO) effect or the electro-optic (EO) effect, whereby the light propagated through the light waveguide is modulated or deflected. As a substrate forming such an element, use has widely been made, for example, of lithium niobate (hereinafter referred to as $LiNbO_3$) crystal and lithium tantalate (hereinafter referred to as $LiTaO_3$) crystal which are excellent in piezo-electric property, acousto-optic effect add electro-optic effect and which have a small light propagation loss.

As a typical method of making a light waveguide by the use of such a crystal substrate, there is a method of heat-diffusing a metal such as titanium (hereinafter referred to as Ti) on the surface of the crystal substrate at a high temperature to thereby form on the surface of the crystal substrate a light waveguide layer having a refractive index slightly greater than the refractive index of the substrate, that is, a Ti internal diffusion method. However, the light waveguide made by this method has a disadvantage that it is susceptible to optical image and can only introduce a light of very small power into the light waveguide. The term "optical damage" refers to "a phenomenon that when the intensity of light input to the light waveguide is increased, the intensity of light propagated through the light waveguide and taken out does not increase in proportion to the intensity of the input light due to scattering."

FIG. 1 of the accompanying drawings is a perspective view show an example of the conventional element having a light waveguide formed by Ti internal diffusion. This example is shown as a case where the element is applied to a high or radio frequency (hereinafter referred to as rf) spectrum analyzer. In FIG. 1, a light emitted from a semiconductor laser 3 is introduced into a light waveguide 2 formed on an $LiNbO_3$ crystal substrate 1 by Ti internal diffusion and becomes a waveguide light 5 and is collimated by a waveguide lens 6, thus becoming a collimated light 7. On the other hand, a comb type electrode 9 is provided on the light waveguide 2, and an rf power input 8 to be analyzed is applied thereto and a surface acoustic wave (SAW) 10 corresponding to the frequency of this input signal is excited. The aforementioned collimated light 7 is subjected to Brag diffraction by the surface acoustic wave 10 and becomes output lights 12 and 13 Fourier-converted into spectral components by a waveguide lens 11. Thus, in the Fourier conversion surface, a spectrum intensity corresponding to the frequency of said input signal can be observed. The Fourier conversion surface is usually set on the end surface 14 of the light waveguide, and by analyzing the light intensity distribution thereon by means of a photodetector such as CCD, the spectral analysis of the real time of the input signal becomes possible.

In this conventional element, as a method of inputting the waveguide light 5, use is made of the so-called Butt coupling method in which the light-emitting surface 4 of the semiconductor laser 3 is directly brought into contact with the end surface of the light waveguide 2. This Butt coupling method is one of the effective methods o coupling a semiconductor laser to a thin film light waveguide because it can obtain high efficiency and is simple in construction. However, to obtain high efficiency, it is necessary to bring the light-emitting surface 4 of the semiconductor laser into intimate contact with the light waveguide 2, and the input coupling portion becomes remarkably high in power density. Therefore, in the light waveguide made by Ti diffusion as descried above, remarkable optical damage occurs in the input coupling portion, and there has been found a phenomenon that with the loss of light power, scattering of the collimated light 7 by the waveguide lens 6 increases.

Also, as in the aforementioned input coupling portion, in the end surface 14 of the waveguide which provides the Fourier conversion surface, power density becomes remarkably high and thus, optical damage occurs. Thus, it is necessary that the input-output portion of an element having a light waveguide such as an rf spectrum analyzer waveguide a light of high power density therethrough, and it becomes necessary to form a light waveguide having a high resistance to optical damage.

On the other hand, several methods of making a light waveguide have been proposed as methods for overcoming the aforementioned optical damage. Typical ones of such methods are (1) the lithium oxide (hereinafter referred to as $Li_2O$) external diffusion method and (2) the ion exchange method. The $Li_2O$ external diffusion method is a method whereby single crystal such as $LiNbO_3$ or $LiTaO_3$ is heat-treated at a high temperature (about 1000° C.) and an Li-lacking layer is formed on the surface of the substrate to thereby form a waveguide. It is known that the light waveguide made by the $Li_2O$ external diffusion method has a remarkably high resistance to optical damage, as compared with the waveguide made by the Ti internal diffusion (see R. L. Holman: SPIE, Vol. 317, page 47, 1981).

However, it is necessary that the thickness of he light waveguide made by the $Li_2O$ external diffusion method be made considerably great, e.g., 10–100 μm, because the variation in the refractive index thereof is small. Accordingly, the energy distribution of the waveguide light spreads in the direction of thickness and the interaction thereof with the surface acoustic wave or the like becomes weaker, and this has led to a disadvantage that the efficiency of light modulation or light deflection is remarkably reduced.

The ion exchange method which is another method of making a light waveguide is a method in which an $LiNbO_3$ or $LiTaO_3$ substrate is treated in a molten salt containing ions of kalium, silver, etc. The method in which the substrate is treated in a weak acid such as benzoic acid and protons (H) are exchanged as ion product is also used as a method of forming a waveguide. It has been confirmed that the light waveguide made by the ion exchange method has a high resistance to optical damage, as compared with the light waveguide made by the Ti internal diffusion method (see Y. Chen. Appl. Phys. Letl., Vol. 40, page 10, 1982). However, in the ion exchange method, distortion occurs in the crystal during the ion exchange process and, for example, in the element as shown in FIG. 1, the surface acoustic wave attenuates and the interaction thereof with the waveguide light becomes weak, and this has led to a disadvantage that the diffraction efficiency is reduced.

SUMMARY OF THE INVENTION

It is an object of the present invention to provide an element having light waveguides which are not susceptible to optical damage and are capable of effecting light modulation or light deflection at high efficiency.

The above object of the present invention is achieved by constructing, in an element having light waveguides, the light input-output area through which light is input or output and the functional area in which the waveguide light is modulated or deflected by an extraneous action, of light waveguides formed by different methods. That is, in the present invention, the light functional portion uses a light waveguide formed by diffusion of a metal having high light modulation or light deflection efficiency and the input-output portion uses a light waveguide of a high threshold value of optical damage formed by external diffusion of lithium oxide or by ion exchange.

DESCRIPTION OF THE PREFERRED EMBODIMENTS

Figure 1:
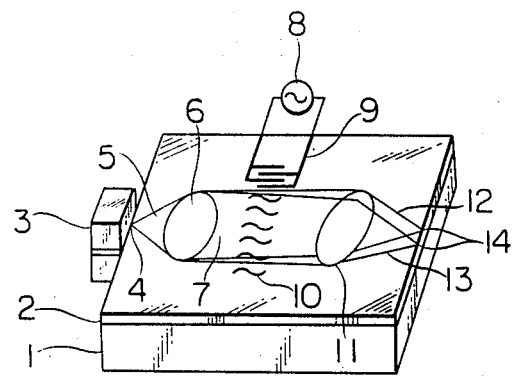
FIG. 1 is a perspective view showing an example of the conventional element having a light waveguide.
Figure 2:
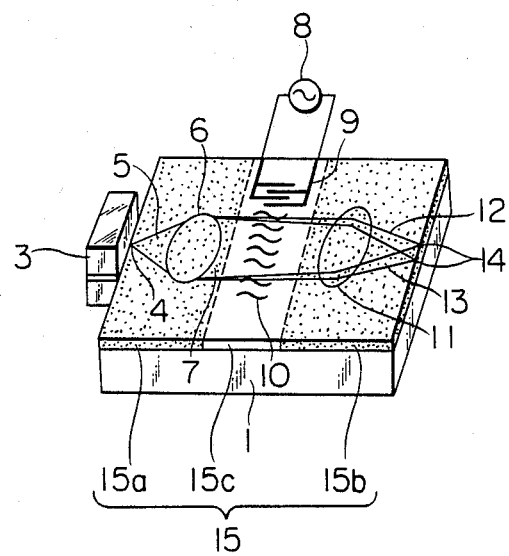
FIG. 2 is a perspective view showing an embodiment of the element of the present invention having light waveguides.

FIG. 2 is a perspective view showing an embodiment of an element having light waveguides according to the present invention. This first embodiment shows a case where the present invention is applied to an rf spectrum analyzer, and in FIG. 2, members similar to those of FIG. 1 are given common reference numerals.

In FIG. 2, on a part of the surface of an LiNbO$_3$ crystal substrate 1, there was formed a first light waveguide comprising 15c layer having Ti diffused in the substrate. On the remaining area of the surface of the substrate, there were formed second light waveguides 15a and 15b comprising a lithium vacant grating layer having the lithium oxide in the substrate diffused externally. Also, a comb type electrode 9 was provided on the first light waveguide 15c. An rf power input 8 to be analyzed was applied to the comb type electrode 9, and a surface acoustic wave 10 of a wavelength corresponding to the frequency of this input signal was excited in the first light waveguide.

A laser light (wavelength $\lambda = 0.83$ $\mu$m, output 5 mW) emitted from the light-emitting surface 4 of a semiconductor laser 3 was introduced from the end surface of the second light waveguide 15a in intimate contact with the light-emitting surface 4 into the light waveguide by the Butt coupling method. The thus introduced waveguide light 5 was collimated by a waveguide lens 6, and the collimated light 7 was propagated through the first light waveguide 15c. This collimated light 7 interacted with the aforementioned surface acoustic wave in the first light waveguide, was subjected to Bragg diffraction and was directed to the second light waveguide 15b. The light directed to the second light waveguide 15b became output lights 12 and 13 Fourier-converted into spectral components by a waveguide lens 11. Accordingly, as in the element of FIG. 1, the spectral analysis of said input signal was effected on the Fourier conversion surface of the waveguide end surface 14.

In the present first embodiment, the area of the light waveguide through which the waveguide light 5 and output lights 12, 13 of high power density were propagated was formed of a light waveguide by the Li$_2$O outside diffusion having a high threshold value of optical damage and therefore, little or no optical damage occurred. Also, the area in which the waveguide light was deflected was formed by a light waveguide by heat diffusion of Ti and therefore, the waveguide light was confined in a relatively shallow part in the vicinity of the surface of the substrate, and the interaction thereof with the surface acoustic wave was strong and high deflection efficiency was obtained.

Description will now be made of a method of making the above-described first embodiment. First, for the formation of a waveguide lens of a geodesic shape, a y-cut LiNbO$_3$ crystal substrate 1 having a ball-like recess formed by a diamond ball was prepared. As a first step, this substrate was heat-treated at a high temperature of 1000° C. for ten hours to cause the Li$_2$O in the substrate to be diffused outside, whereby a second light waveguide was formed on the whole of the surface of the substrate. Subsequently, as a second step, by the conventional masking technique, Ti was deposited by evaporation only on the area of the second light waveguide through which the surface acoustic wave was to be propagated, and such area was heat-treated at 100° C. for 2.5 hours, whereby Ti was heat-diffused in the substrate and the first light waveguide 15C was formed. Thus, the remaining area became second light waveguides 15a and 15b. Finally, a comb-like electrode 9 for exciting the surface acoustic wave was formed by an aluminum electrode by the use of the conventional photolithography technique. The end surfaces of the second light waveguides 15a and 15b which are the light input and output portions were accurately position-set so as to be coincident with the focus positions of waveguide lenses 6 and 11, and were subjected to optical polishing.

A second embodiment of the element of the present invention will now be described by reference also to FIG. 2. In the present second embodiment, the first light waveguide 15C was formed by diffusion of Ti, and the second light waveguides 15a and 15b were formed by ion exchange. The element of this embodiment functioned just like the first embodiment.

In the present second embodiment, the area through which the waveguide light 5 and output lights 12, 13 of high power density were propagated was formed of a light waveguide by ion exchange having a high threshold value of optical damage and therefore, little or no optical damage occurred. Also, the area through which the surface acoustic wave was propagated was all formed by a light waveguide by heat diffusion of Ti and therefore, no attenuation of the surface acoustic wave occurred and high deflection efficiency was obtained.

The above-described second embodiment was made in the following manner. First, a substrate 1 similar to that of the first embodiment was prepared, and Ti was heat-diffused in the area of the surface of the substrate through which the surface acoustic wave was to be propagated, whereby the first light waveguide 15C was formed. Subsequently, a thin gold film as a mask was provided on this waveguide 15C, and second light waveguides 15a and 15b were formed on the input and output portions by ion exchange. The ion exchange was carried out by immersing the substrate in benzoic acid heated to 250° C. for one hour.

As described above, the element according to the present invention can enhance the resistance to optical damage without reducing the modulation efficiency by forming the light waveguides of high optical damage resistance in the light input and output portions and forming the light waveguide excellent in modulation characteristic in the light modulating or deflecting portion.

According to the present invention, there is a further advantage that by forming the functional area for areas by light waveguides made by different methods, as described above, the distribution of the light of each portion in the direction of depth can be controlled and the input and output efficiency and the modulation efficiency can be maximized. For example, the distribution in the direction of depth of the light wave propagated through the light waveguides in the input and output areas must be made as coincident as possible with the distribution of intensity of the input semiconductor laser, and the input efficiency is determined by the superposition of these two distributions of intensity. On the other hand, in the functional area, the modulation or deflection efficiency is more enhanced and modulation or diflection becomes possible by a lower power when the portion in which the refractive index or the like has been modulated is coincident with the distribution of intensity of the waveguide light. In the case of the surface acoustic wave, it is necessary to optimally design the thickness of the waveguide so that the superposition of the distribution of intensity of the surface acoustic wave and the distribution of intensity of the waveguide light is great. The thickness of the waveguide for maximizing the input efficiency in the aforementioned input and output area generally differs from the thickness of the waveguide for maximizing the modulation or deflection efficiency in the functional area and therefore, it is effective to form these two areas by two different light waveguides as in the present invention.

The present invention is not restricted to the above-described embodiments, but various applications thereof are possible. For example, in the above-described embodiments, an LiNbO$_3$ crystal substrate is used as the substrate, but a lithium tantalate(Li Ta O$_3$) crystal substrate may also be used to form the thin film type optical element of the present invention by an entirely similar method. The metal heat-diffused in the substrate is not limited to Ti, but may also be V, Ni, Au, Ag, Co, Nb, Ge or the like. Further, the present invention has been described with respect to the functional element using the surface acoustic wave, but of course, the present invention is also applicable to an element using the electro-optic effect, the thermo-optic effect or the like. Also, in the above-described two embodiments, particularly the Butt coupling method is used as the input-output coupling method, but the effect of the present invention will not be lost even if the input-output coupling by a prism coupler or a grating coupler is employed.

The element of the present invention having light waveguides is applicable not only to the aforedescribed spectrum analyzer but also to various elements such as a light deflector, a light modulator, a correlater and an optical switch.

What I claim is:

1. An element having light waveguides, comprising:
   a planar substrate comprising one of lithium niobate crystal and lithium tantalate crystal and having a first surface and an end surface;
   a first light waveguide formed by diffusing a metal in a part of the first surface of said substrate spaced from said end surface;
   a second light waveguide formed by externally diffusing the lithium oxide in said substrate in the remain in area of the first surface of said substrate;
   means for introducing light, through said end surface, into said second light waveguide as a diverging light;
   means for varying the refractive index of said first light waveguide by extraneous action and modulating or deflecting said light propagated through said first light waveguide;
   a Butt coupling, through which waveguide light is introduced from said end surface of said second light waveguide; and
   a semiconductor laser in intimate contact with said end surface of said second light waveguide,
   wherein said second light waveguide is formed so that the distribution of the intensity of the light propagated through said second light waveguide in the direction of depth of said second waveguide is substantially coincident with the distribution of intensity of light output by said semiconductor laser.

2. An element according to claim 1, wherein said means for modulating or deflecting said waveguide light comprises means for exciting a surface acoustic wave on said first light waveguide.

3. An element according to claim 2, wherein said means for exciting a surface acoustic wave comprises a comb type electrode provided on said first light waveguide, and a power source for inputting a high frequency signal to said comb type electrode.

4. An element according to claim 1, wherein said metal is Ti.

5. A method of making an element having light waveguides, comprising the steps of:
   heat-treating a planar substrate, comprising one of lithium niobate crystal and lithium tantalate crystal and having a first surface and at least one end surface, at a high temperature, and externally diffusing the lithium oxide in said substrate, thereby forming a second light waveguide on the whole of said first surface of said substrate;
   heat diffusing a metal in a part of the area of said second light waveguide spaced from said end surface and forming a first light waveguide;
   forming an electrode for light modulation or light deflection on said first light waveguide;
   providing means for introducing light, through said end surface, into said second light waveguide as diverging light;
   providing a Butt coupling, through which waveguide light is introduced form said end surface of said second light waveguide; and
   providing a semiconductor laser in intimate contact with said end surface of said second light waveguide;

wherein said second light waveguide is formed so that the distribution of the intensity of the light propagated through said second light waveguide in the direction of the depth of said second waveguide is substantially coincident with the distribution of intensity of light output by said semiconductor laser.

6. An element having light waveguides, comprising:
a planar substrate having a first surface and at least one end surface;
a first light waveguide formed by diffusing a metal in a part of said first surface of said substrate spaced from said end surface;
a second light waveguide formed in the remaining area of said first surface of said substrate by ion exchange;
means for introducing light through said end surface into said second light waveguide as a diverging light;
means for exciting a surface acoustic wave on said first light waveguide, causing said surface acoustic wave to interact with said light propagated through said first light waveguide thereby modulating or deflecting said light;
a Butt coupling, through which waveguide light is introduced from said end surface of said second light waveguide; and
a semiconductor laser in intimate contact with said end surface of said second light waveguide,
wherein said second light waveguide is formed so that the distribution of the intensity of the light propagated through said second light waveguide in the direction of the depth of said second waveguide is substantially coincident with the distribution of intensity of light output by said semiconductor laser.

7. An element according to claim 6, wherein said means for modulating or deflecting said light comprises a comb type electrode provided on said first light waveguide, and a power source for inputting a high frequency signal to said comb type electrode.

8. An element according to claim 6, wherein said substrate comprises one of lithium niobate crystal and lithium tanalate crystal.

9. An element according to claim 6, wherein said metal is Ti.

10. An element having light waveguides, comprising:
a planar substrate comprising one of lithium niobate crystal and lithium tantalate crystal and having a first surface and an end surface;
a light waveguide formed by externally diffusing the lithium oxide in said first surface of said substrate;
a Butt coupling, through which waveguide light is introduced from said end surface of said light waveguide, and
a semiconductor laser in intimate contact with said end surface of said light waveguide,
wherein said light waveguide is formed so that the distribution of the intensity of the light propagated through said light waveguide in the direction of the depth of said waveguide is substantially coincident with the distribution of intensity of light output by said semiconductor laser.

11. An element having light waveguides, comprising:
a planar substrate having a first surface and at least one end surface;
a light wave guide formed in said first surface of said substrate by only ion-exchange;
a Butt coupling, through which waveguide light is introduced from said end surface of said light waveguide; and
a semiconductor laser in intimate contact with said end surface of said light waveguide,
wherein said light waveguide is formed so that the distribution of the intensity of the light propagated through said light waveguide in the direction of the depth of said waveguide is substantially coincident with the distribution of intensity of light output by said semiconductor laser.

12. An element according to claim 11, wherein said substrate comprises one of lithium noibate crystal and lithium tantalate crystal.

* * * * *

UNITED STATES PATENT AND TRADEMARK OFFICE
CERTIFICATE OF CORRECTION

PATENT NO. : 4,793,675

DATED : December 27, 1988

INVENTOR(S) : YUICHI HANDA

It is certified that error appears in the above-identified patent and that said Letters Patent is hereby corrected as shown below:

COLUMN 2

Line 12, "o" should read --of--.

Line 49, "he" should read --the--.

COLUMN 3

Line 47, "comprising 15c" should read --15c comprising a --.

COLUMN 4

Line 34, "100°" should read --1000°--.

COLUMN 5

Line 17, "for areas" should read --for modulating or deflecting light and the input and output areas--.

COLUMN 6

Line 13, "remain" should read --remain- --.

Line 14, "in" should read --ing--.

COLUMN 8

Line 40, "noibate" should read --niobate--.

Signed and Sealed this

Eighth Day of August, 1989

Attest:

DONALD J. QUIGG

Attesting Officer      Commissioner of Patents and Trademarks